United States Patent
Fujita et al.

[11] Patent Number: 5,923,355
[45] Date of Patent: Jul. 13, 1999

[54] OPTICAL WRITING DEVICE

[75] Inventors: Atsushi Fujita, Otsu; Kenichi Wada; Tomohiko Masuda, both of Takatsuki, all of Japan

[73] Assignee: Minolta, Co., Ltd., Osaka, Japan

[21] Appl. No.: 08/234,711

[22] Filed: Apr. 28, 1994

Related U.S. Application Data

[63] Continuation of application No. 07/913,593, Jul. 14, 1992.

[30] Foreign Application Priority Data

| Jul. 16, 1991 | [JP] | Japan | 3-175128 |
| Jul. 16, 1991 | [JP] | Japan | 3-175130 |

[51] Int. Cl.$^6$ .............. B41J 2/385; B41J 2/47; H04N 1/23
[52] U.S. Cl. .............. 347/131; 347/240; 358/298
[58] Field of Search .............. 346/107 R; 358/298, 358/302, 459, 300; 347/240, 251, 131, 252

[56] References Cited

U.S. PATENT DOCUMENTS

| 4,074,318 | 2/1978 | Kapes, Jr. | 358/302 X |
| 4,074,319 | 2/1978 | Goldschmidt et al. | 358/302 X |
| 4,365,275 | 12/1982 | Berman et al. | 358/298 X |
| 4,394,662 | 7/1983 | Yoshida et al. | 358/298 X |
| 4,475,115 | 10/1984 | Garbe et al. | 347/130 |
| 4,524,372 | 6/1985 | De Cock et al. | 347/238 |
| 4,525,729 | 6/1985 | Agulnek et al. | 347/238 X |
| 4,679,057 | 7/1987 | Hamada | 358/298 X |
| 4,727,428 | 2/1988 | Futatsugi et al. | 358/296 |
| 4,835,551 | 5/1989 | Ng | 358/296 |
| 4,843,408 | 6/1989 | Tanaka | 358/298 |
| 4,902,111 | 2/1990 | Matsubara et al. | 359/254 |
| 4,905,027 | 2/1990 | Itoh | 347/237 |
| 4,932,761 | 6/1990 | Shingaki et al. | 359/246 |
| 5,043,743 | 8/1991 | Habets et al. | 347/240 |
| 5,245,355 | 9/1993 | Morton | 347/131 X |

FOREIGN PATENT DOCUMENTS

| 63-189268 | 8/1988 | Japan. |
| 63-272568 | 11/1988 | Japan. |
| 1-272469 | 10/1989 | Japan. |

*Primary Examiner*—David F. Yockey
*Attorney, Agent, or Firm*—Sidley & Austin

[57] ABSTRACT

An optical writing device by which an image with desired tone can be obtained. The optical writing device includes a write head and a modulation unit. A time for scanning of one picture element is divided into some periods by the modulation unit. The modulation unit judges whether the picture element will be in an imaged region or in a blank region and whether the picture element must be provided with a supplementary exposure value. The picture element will be provided with an accumulated exposure value corresponding to a desired level of tone by being provided with the supplementary exposure value by order of the modulation unit.

56 Claims, 6 Drawing Sheets

OPTICAL WRITING DEVICE

This application is a continuation of application Ser. No. 07/913,593, filed Jul. 14, 1992.

BACKGROUND OF THE INVENTION

1. Field of the Invention

The present invention relates to an optical writing device to be installed in an image forming apparatus such as a printer or a facsimile.

2. Description of Related Art

One of well-known optical writing devices is that disclosed by Japanese Patent Laid Open Publication No. 1-272469. In the device, a time for scanning of one picture element is divided into some periods, and the exposure strengths in the periods are different from each other. Another of well-known optical writing devices is that disclosed by Japanese Patent Laid Open Publication No. 63-272568. In the device, a time for scanning of one picture element is divided into some periods, and the exposure times in the periods are different from each other. In both of the optical writing devices, exposure elements are turned on and off individually and selectively in accordance with image data in each of the periods so that the picture element will be provided with an accumulated exposure value corresponding to a desired level of tone. However, in the devices, toner deposition on blank regions sometimes occurs, and it has been difficult to obtain complete blank regions.

SUMMARY OF THE INVENTION

An object of the present invention is to provide an optical writing device which can make an image with desired tone and with complete blank regions by controlling the accumulated exposure value of each picture element.

In order to attain the object, an optical writing device according to the present invention has means for dividing a time for scanning of a picture element into a plurality of periods. At least one of the periods is designated as a supplementary exposure period, and the other periods are designated as tone level exposure periods. Each exposure element of the optical writing device provides the corresponding picture element with a supplementary exposure value in the supplementary exposure period and provides the corresponding picture element with mutually different exposure values in the tone level exposure periods. The exposure elements are turned on and off individually and selectively in accordance with image data in each of the periods. Thereby, each picture element can be provided with an exposure value corresponding to a desired tone level.

Further, in a case of normal (positive-positive) development, picture elements which will form blank regions are provided with the supplementary exposure value. Thereby, the surface potential of the picture elements is reduced enough such that toner will never be deposited thereon, and consequently, complete blank regions can be obtained. In a case of reversal (negative-positive) development, picture elements which will form imaged regions are provided with the supplementary exposure value. Thereby, the surface potential of the picture elements is reduced enough such that toner will be deposited only thereon, and consequently, complete blank regions can be obtained.

Another optical writing device according to the present invention has means for dividing a time for scanning of a picture element into a plurality of periods, and all the periods are designated as tone level exposure periods. Each exposure element of the optical writing device provides the corresponding picture element with mutually different exposure values in the periods and provides the corresponding picture element with a supplementary exposure value in at least one of the periods. The exposure elements are turned on and off individually and selectively in accordance with image data in each of the periods. Thereby, each picture element can be provided with an exposure value corresponding to a desired tone level.

Further, in a case of reversal (negative-positive) development, picture elements which will form imaged regions are provided with the supplementary exposure value. Specifically, in at least one of the periods, each of the picture elements which will form imaged regions is exposed for an extended time to be provided with the supplementary exposure value in addition to the exposure value which realizes the desired tone level. Thereby, the surface potential of the picture elements is reduced enough such that toner will be deposited only thereon, and consequently, complete blank regions can be obtained.

BRIEF DESCRIPTION OF THE DRAWINGS

This and other objects and features of the present invention will become apparent from the following description in reference to the accompanying drawings, in which:

FIG. 1 through FIG. 9 show a first embodiment of the present invention;

FIG. 1 is a schematic view of a printer employing an optical writing device of the first embodiment;

FIG. 2 is a block diagram showing the circuitry of the optical writing device;

FIG. 3 is a graph showing the relation among surface potential of a photosensitive drum, exposure value and tone under reversal (negative-positive) development;

FIG. 4 is a time chart showing timing of changing the levels of signals in the optical writing device;

FIG. 5 is a schematic view of numerical image data;

FIG. 6 is a schematic view of data stored in a bit map memory, the data being converted from the image data shown in FIG. 5;

FIG. 7 is a graph showing the relation among surface potential of the photosensitive drum, exposure value and tone under normal (positive-positive) development;

FIG. 8 is a time chart showing a way of changing the level of a driving voltage in the optical writing device;

FIG. 9 is a time chart showing another way of changing the level of the driving voltage in the optical writing device;

FIG. 10 through FIG. 13 show a second embodiment of the present invention;

FIG. 10 is a block diagram showing the circuitry of an optical writing device of the second embodiment;

FIG. 11 is a time chart showing timing of changing the levels of signals in the optical writing device;

FIG. 12 is a schematic view of numerical image data; and

FIG. 13 is a schematic view of data stored in a bit map memory, the data being converted from the image data shown in FIG. 12.

DETAILED DESCRIPTION OF THE PREFERRED EMBODIMENTS

Some exemplary optical writing devices according to the present invention are hereinafter described with reference to the accompanying drawings. Each embodiment is an optical writing device installed in a printer. The same components and portions in the following embodiments are referenced by the same numbers and marks.

Figure 1:
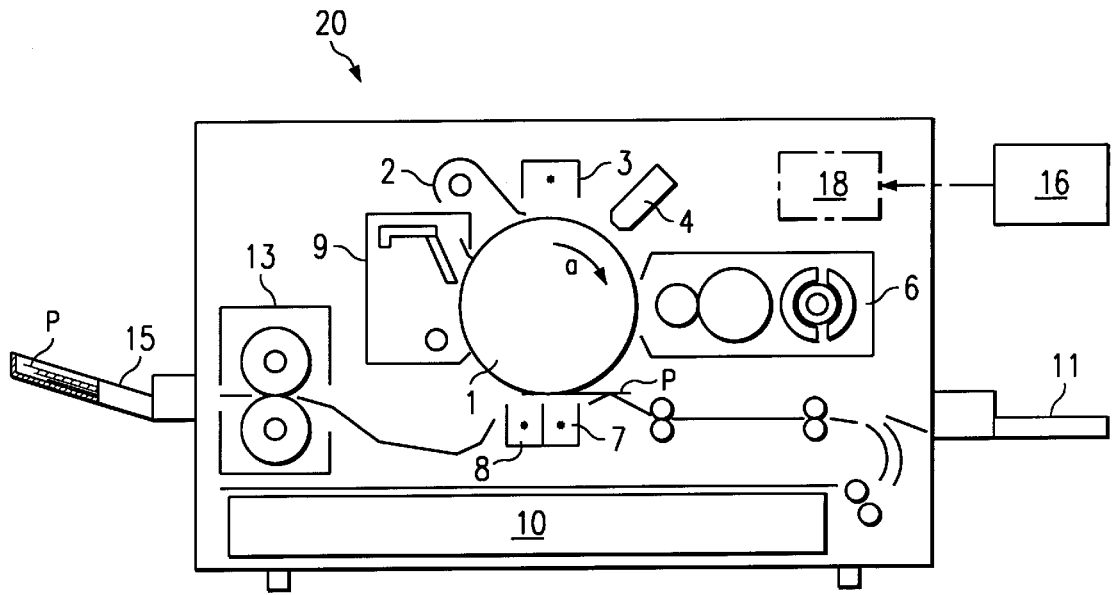

Optical Writing Device of a First Embodiment
Structure and Operation of the Printer Referring to FIG. 1, a photosensitive drum 1 is disposed substantially in the center of a printer 20 so as to be rotatable in a direction indicated by arrow a. Around the photosensitive drum 1 are an eraser lamp 2, an electric charger 3, a write head 4 of an optical writing device, a developing device 6, a transfer charger 7, a separation charger 8 and a cleaning device 9. The photosensitive drum 1 has a photosensitive layer thereon, and the photosensitive layer is electrically charged uniformly while the photosensitive drum 1 rotates passing the eraser lamp 2 and the electric charger 3. The write head 4 is driven in accordance with image data sent from a host computer 16 through a modulation unit 18 of the optical writing device.

Recording sheets P are fed one by one from an automatic sheet feed tray 10 which is disposed in the lower part of the printer 20 or a manual sheet feed tray 11 which is disposed in the right side of the printer 20. Each recording sheet is fed to the transfer charger 7 in synchronization with an image formed on the photosensitive drum 1 to receive the image and thereafter separated from the photosensitive drum 1 by the separation charger 8. Then, the sheet is fed to a fixing device 13 where the image is fixed on the sheet and ejected onto a tray 15. After the image transfer from the photosensitive drum 1 to the recording sheet, residual toner and residual charge on the photosensitive drum 1 are removed by the cleaning device 9 and the eraser lamp 2, such that the photosensitive drum 1 gets ready for the next image formation.

Structure and Operation of the Optical Writing Device

Figure 2:
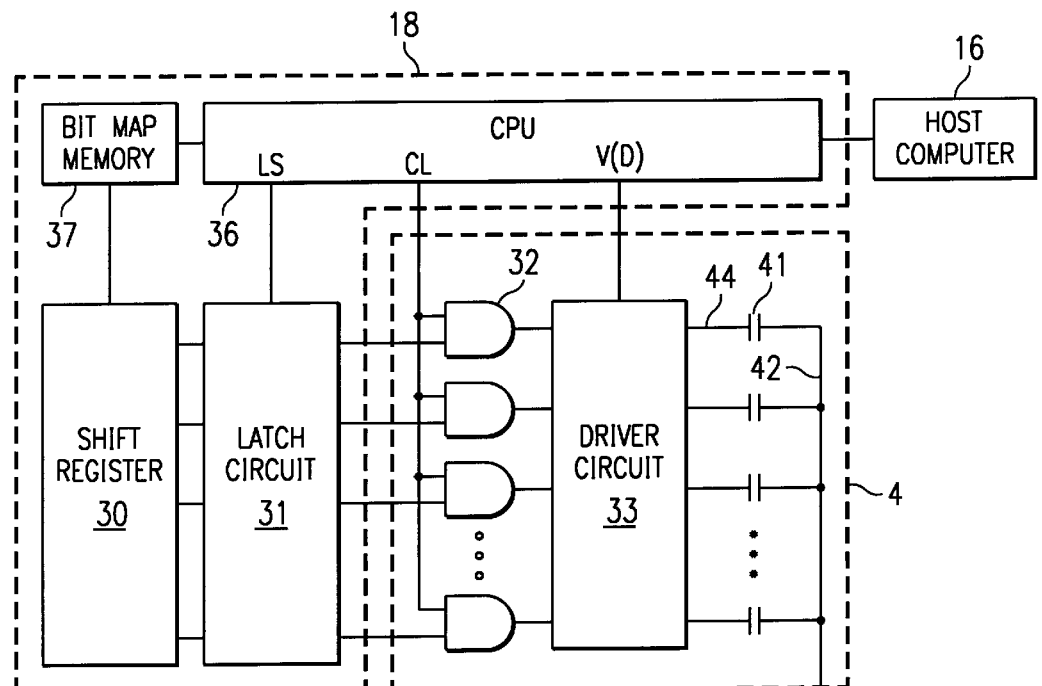

FIG. 2 shows the structure of the optical writing device. The optical writing device comprises the write head 4 and the modulation unit 18. The write head 4 is. a light shutter array. For example, the write head 4 comprises light shutter elements 41 which are made of PLZT, a driver circuit 33 and AND elements 32. These elements 32, 33 and 41 are disposed on a glass board. The light shutter elements 41 are arranged in a line extending in parallel to the rotating axis of the photosensitive drum 1 and form an exposure section. The light shutter elements 41 transmit and shut out a light emitted from a light source individually. The light shutter elements 41 transmit the light when they are impressed with a specified voltage. The voltage impression on the light shutter elements 41 is performed individually in accordance with image data. The amount of light which each light shutter element 41 transmits, and therefore the exposure strength of each picture element, depends on the voltage impressed on the light shutter element 41. One end of each light shutter element 41 is grounded via a common electrode 42, and the other end thereof is connected with the driver circuit 33 via an individual electrode 44. The driver circuit 33 drives the light shutter elements 41 individually.

The driver circuit 33 is impressed with a driving voltage V(D) by order of a CPU 36 of the modulation unit 18. The output terminal of each AND element 32 is connected with an input terminal of the driver 33, and the driver circuit 33 receives image signals in accordance with image data from the AND elements 32. Therefore each light shutter element 41 is turned on and off in accordance with the image signal sent from the corresponding AND element 32. More specifically, each light shutter element 41 is turned on to transmit the light when the image signal sent from the corresponding AND element 32 is at a level of "H", and it is turned off to shut out the light when the image signal sent from the corresponding AND element 32 is at a level of "L". Thus, the driver circuit 33 and the AND elements 32 turn on and off the light shutter elements 41 individually so that each picture element can be electrostatically reproduced on the photosensitive drum 1 through the corresponding light shutter element 41. Each AND element 32 receives from the CPU 36 a control signal CL which determines the exposure time. Additionally, each AND element 32 receives latch data from a latch circuit 31 of the modulation unit 18.

The modulation unit 18 consists mainly of a shift register 30, the latch circuit 31, the CPU 36 and a bit map memory 37. The bit map memory 37 is attached to the CPU 36, and image data sent from the host computer 16 to the CPU 36 are stored in the bit map memory 37. At that time, the CPU 36 makes supplementary data from the image data, and the image data and the supplementary data are stored in the bit map memory 37. The bit map memory 37 sends the image data and the supplementary data to the shift register 30. When data for one exposure are sent to the shift register 30, the CPU 36 generates a latch pulse LS to the latch circuit 31. Then, the latch circuit 31 latches the data for one exposure and sends the data to the AND elements 32. When the control signal CL sent from the CPU 36 comes to the level of "H", the driving voltage V(D) is impressed on light shutter elements 41 which are selected in accordance with the data. The light shutter elements 41 which are impressed with the driving voltage V(D) are turned on to transmit the light emitted from the light source and to expose the corresponding parts of the photosensitive drum 1. The exposure strength depends on the level of the driving voltage V(D). Light shutter elements 41 which are not impressed with the driving voltage V(D) are kept off to shut out the light emitted from the light source.

Application of the Optical Writing Device to Reversal (Negative-Positive) Development The following describes a case in which the optical writing device of the first embodiment is installed in an image forming apparatus which performs reversal (negative-positive) development. In this case, the tone of an image is controlled by varying the driving time of the light shutter elements 41, that is, varying the exposure time.

Figure 3:
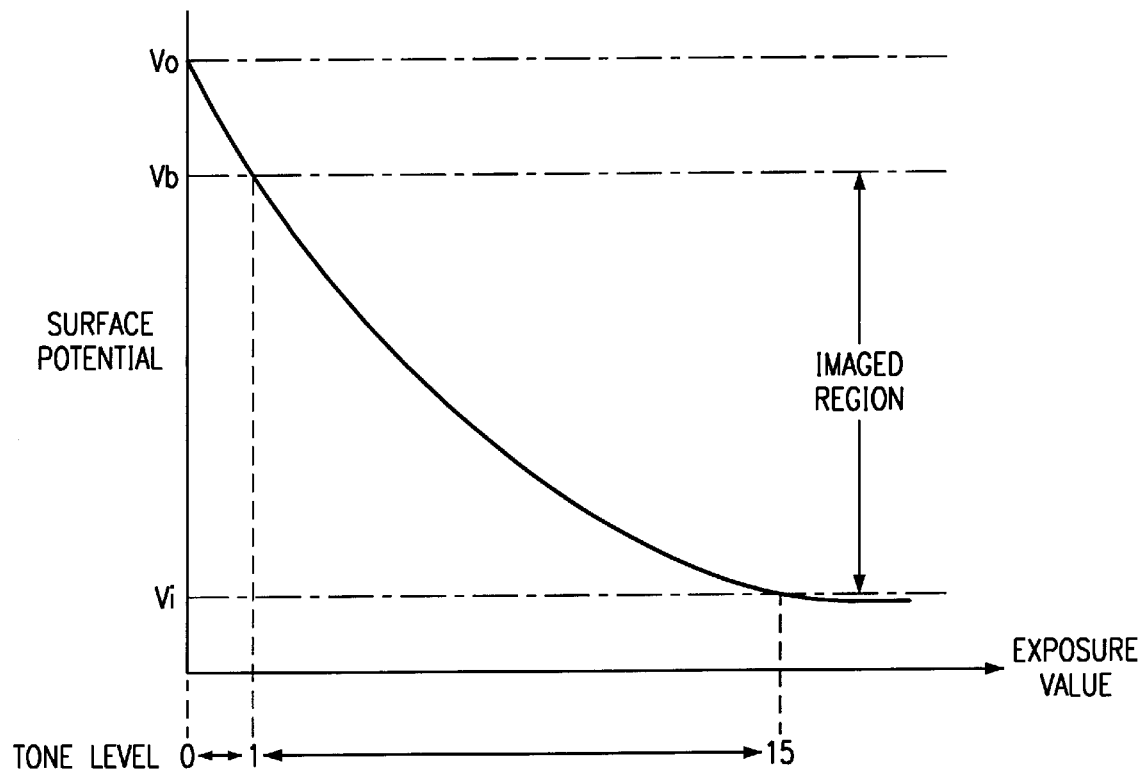

FIG. 3 shows the relation among surface potential of the photosensitive drum 1, exposure value and tone under the reversal development. In FIG. 3, Vo denotes an initial surface potential, Vb denotes a developing bias voltage, and Vi denotes a saturation point of the surface potential. As the exposure value is increasing, the surface potential is decreasing, though the decrease in the surface potential is not exactly proportional to the increase in the exposure value. Toner will be deposited on areas of which surface potential is in a range from Vb to Vi, that is, areas of which surface potential is in a range from Vb to Vi will be imaged regions. The tone of an image can be controlled by varying the surface potential within a range from Vb to Vi. Now, an image with 16 tone levels indicated by numerals from 0 to 15 is desired. A tone level of 0 (lowest tone level) indicates blank, and this is obtained from the initial surface potential Vo. A tone level of 1 indicates the lightest, and this is obtained from the surface potential Vb corresponding to the developing bias voltage. A tone level of 15 indicates the darkest, and this is obtained from the saturation point Vi of the surface potential. Regions with the tone level of 0 (blank regions) must be especially distinct from regions with the other toner levels (imaged regions). In order to do that, the difference between the potential Vo which results in the tone level of 0 and the potential Vb which results in the tone level of 1 must be sufficiently large, and in order to reduce the surface potential from Vo to Vb, a supplementary exposure value is required.

Figure 4:
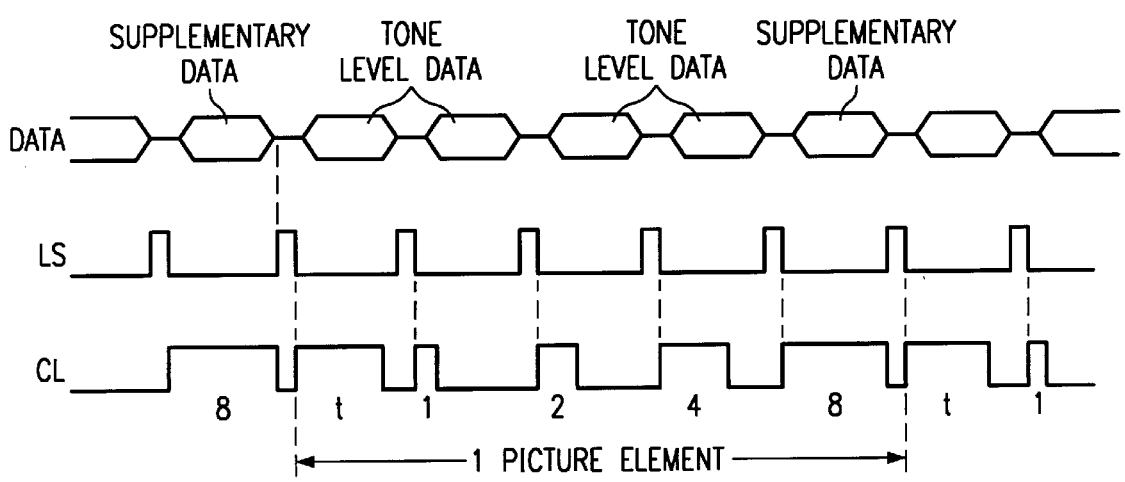

As shown in FIG. 4, a time required for scanning of one line is divided into five uniform periods, and control (selecting and driving) of the light shutter elements 41 is performed five times to scan one line. In other words, each picture element is formed by combining the total of five times of turning-on and turning-off of the corresponding light shutter element 41. The combination of turning-on and turning-off is made so that the accumulated exposure value of the picture element will lead to the desired tone level. In order to carry out this control, a storage allocation of the bit map memory 37 for one scanning line is five times as large as that for one exposure of the line. The first period of scanning of one line is used to provide the supplementary exposure value, that is, to distinguish the imaged regions from the blank regions. The other four periods are used to make 15 tone levels in the imaged regions. The former period is referred to as supplementary exposure period, and the latter four periods are referred to as tone level exposure periods. A fixed voltage V(D) is impressed on the light shutter elements 41 in the five periods.

The control signal CL is kept at the level of "H" for different times in the tone level exposure periods. More specifically, the control signal CL is kept at the level of "H" for a time "1" in the second period, for a time "2" in the third period, for a time "4" in the fourth period and for a time "8" in the fifth period. In other words, the light shutter elements 41 are driven for the times "1", "2", "4" and "8" in the second, the third, the fourth and the fifth periods respectively. Accordingly, exposure values in the third, the fourth and the fifth periods are twice, four times and eight times as high as that in the second period respectively. In the supplementary exposure period, the control signal CL is kept at the level of "H" for a time "t". The time "t" is determined depending on the conditions of the photosensitive drum 1 and the circumstances. Fifteen tone levels from 1 (the lightest) to 15 (the darkest) can be made by combining the turning-on of the light shutter elements 41 in the four tone level exposure periods. In the first (supplementary exposure) period, all the picture elements of the imaged regions are exposed, while the picture elements of the blank regions are not exposed. Thereby, after the first period, the surface potential of the imaged regions is already reduced nearly to Vb, while the blank regions keeps the initial surface potential Vo. In this way, without a special circuit, the blank regions are distinguished from the imaged regions clearly, and toner will never be deposited on the blank regions. With this control, the accumulated exposure value of each picture element can be easily regulated to obtain a desired tone level.

Figures 5, 6:
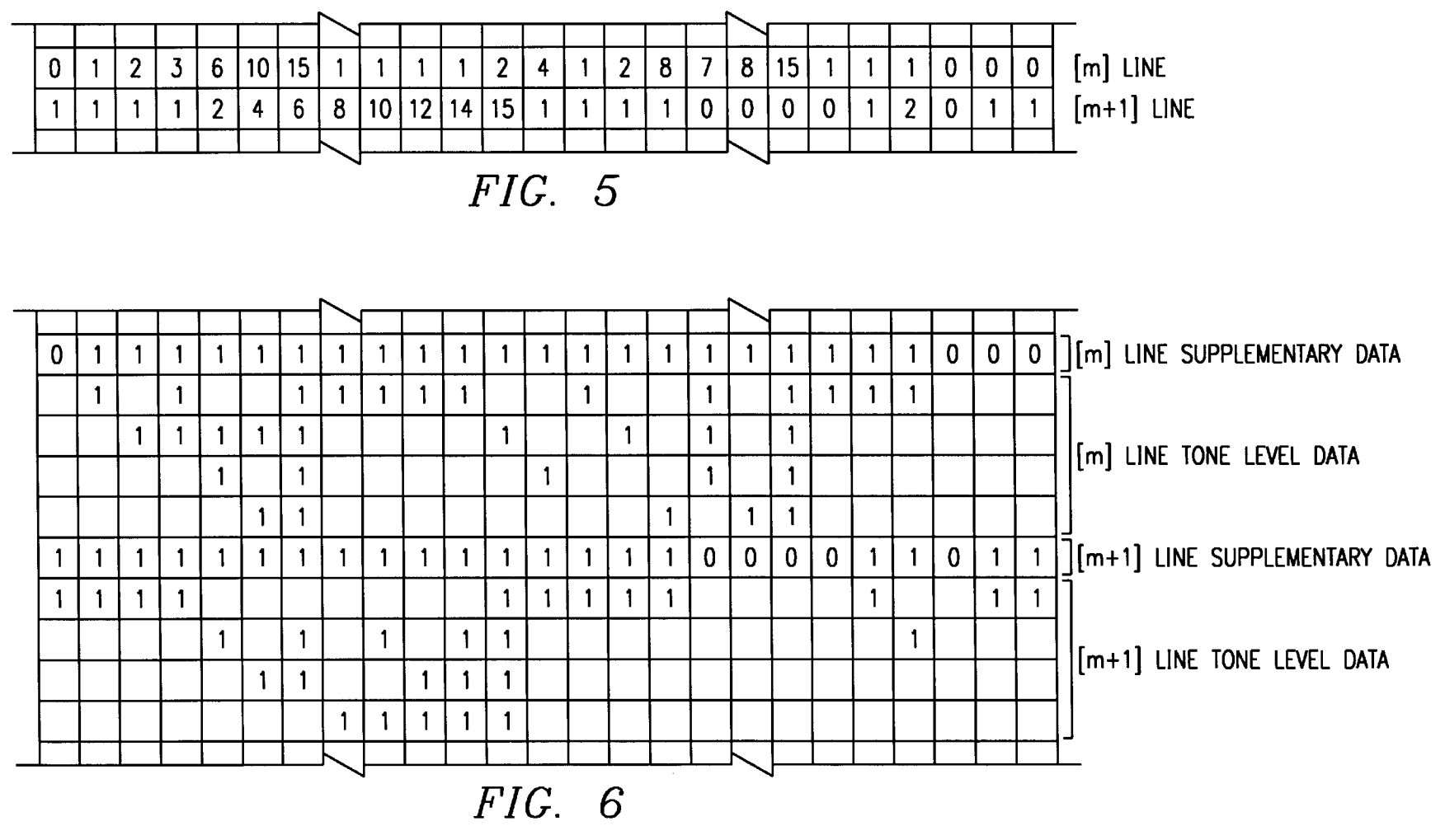

FIG. 5 shows desired tone levels of picture elements indicated by the numerals from 0 to 15. FIG. 6 shows data required for obtaining the tone shown in FIG. 5, and the data is stored in the bit map memory 37 so as to control each light shutter element 41 in cooperation with the control signal CL in the above-described manner. A state of "1" of the data commands that the corresponding light shutter element 41 be impressed with the voltage V(D) to transmit the light emitted from the light source and to expose the corresponding picture element.

Figure 7:
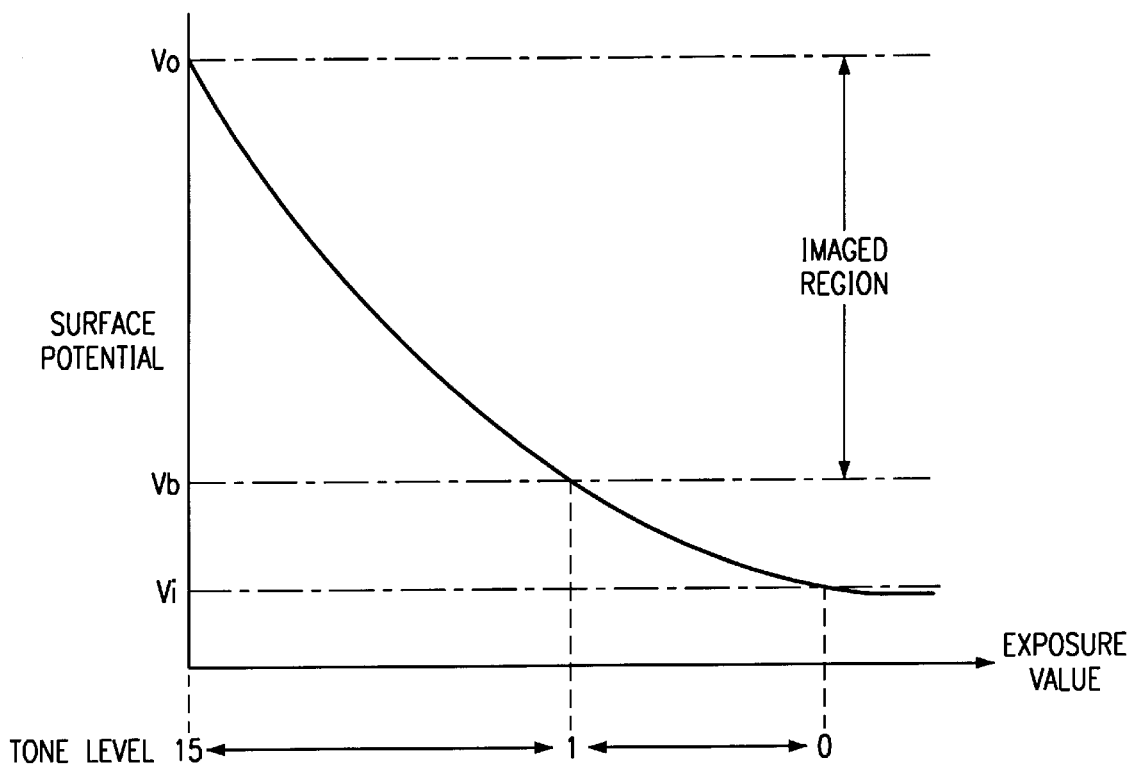

Application of the Optical Writing Device to Normal (Positive—Positive) Development The following describes a case in which the optical writing device of the first embodiment is installed in an image forming apparatus which performs normal (positive—positive) development. In this case, the tone of an image is controlled by varying the driving voltage V(D) impressed on the light shutter elements 41, that is, varying the exposure strength. FIG. 7 shows the relation among surface potential of the photosensitive drum 1, exposure value and tone. Vo denotes an initial surface potential, Vb denotes a developing bias voltage, and Vi denotes a saturation point of the surface potential. Toner will be deposited on areas of which surface potential is in a range from Vo to Vb, that is, areas of which surface potential is in a range from Vo to Vb will be imaged regions. The tone of an image can be controlled by varying the surface potential within a range from Vo to Vb. Now, an image with 16 tone levels indicated by numerals from 0 to 15 is desired. A tone level of 0 (lowest tone level) indicates blank, and this is obtained from the saturation point Vi of the surface potential. A tone level of 1 indicates the lightest, and this is obtained from the surface potential Vb corresponding to the developing bias voltage. A tone level of 15 indicates the darkest, and this is obtained from the initial surface potential Vo. As exposure value is increasing, the surface potential is decreasing, but the decrease in the surface potential is not exactly proportional to the increase in the exposure value. Especially near the saturation point Vi, a large increase in the exposure value is required to decrease the surface potential. Under the condition, regions with the tone level of 0 (blank regions) must be especially distinct from regions with the other tone levels (imaged regions). In other words, the difference between the surface potential Vb which results in the tone level of 1 and the surface potential Vi which results in the tone level of 0 must be sufficiently large, and in order to reduce the surface potential from Vb to Vi, a large exposure value is required.

Figure 8:
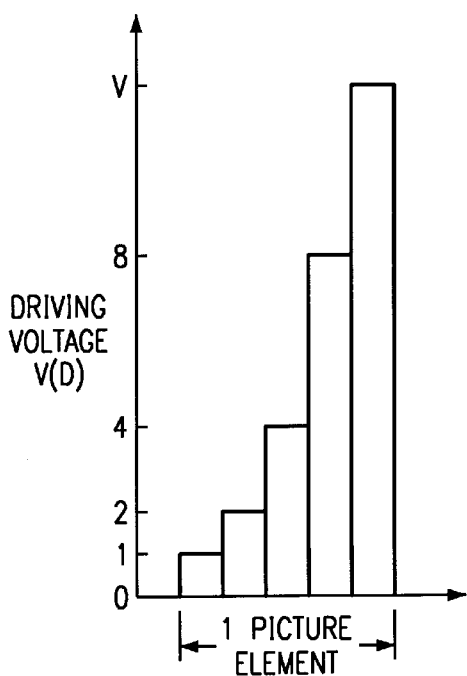

As shown in FIG. 8, a time required for scanning of one line is divided into five uniform periods. Four of the five periods are used to make 15 tone levels in imaged regions, and the other one period is used to supplement the exposure value for clear blank regions. The former four periods are referred to as tone level exposure periods, and the latter one period is referred to as supplementary exposure period. In the five periods, the light shutter elements 41 are driven for the same time. Different voltages are impressed on the light shutter elements 41 in the four tone level exposure periods. More specifically, voltages of "1", "2", "4" and "8" are impressed on the light shutter elements 41 in the four periods respectively. In the supplementary exposure period, a voltage of "v" is impressed. The voltage "v" is determined depending on the conditions of the photosensitive drum 1 and the circumstances. Fifteen tone levels from 1 to 15 can be made by combining the turning-on of the light shutter elements 41 in the four tone level exposure periods. In the supplementary exposure period, only the light shutter elements 41 corresponding to picture elements which will form blank regions are impressed with the driving voltage V(D) of "v".

Figure 9:
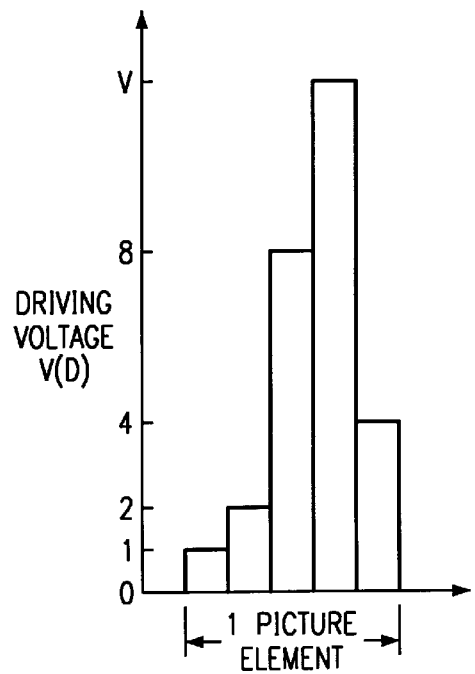

The variation of the driving voltage V(D) among the five values can be performed in any order. For example, the driving voltage V(D) can be varied not only to increase in order from "1", "2", "4", "8" and then to "v" as shown in FIG. 8 but also to change among the values at random as shown in FIG. 9.

Figure 10:
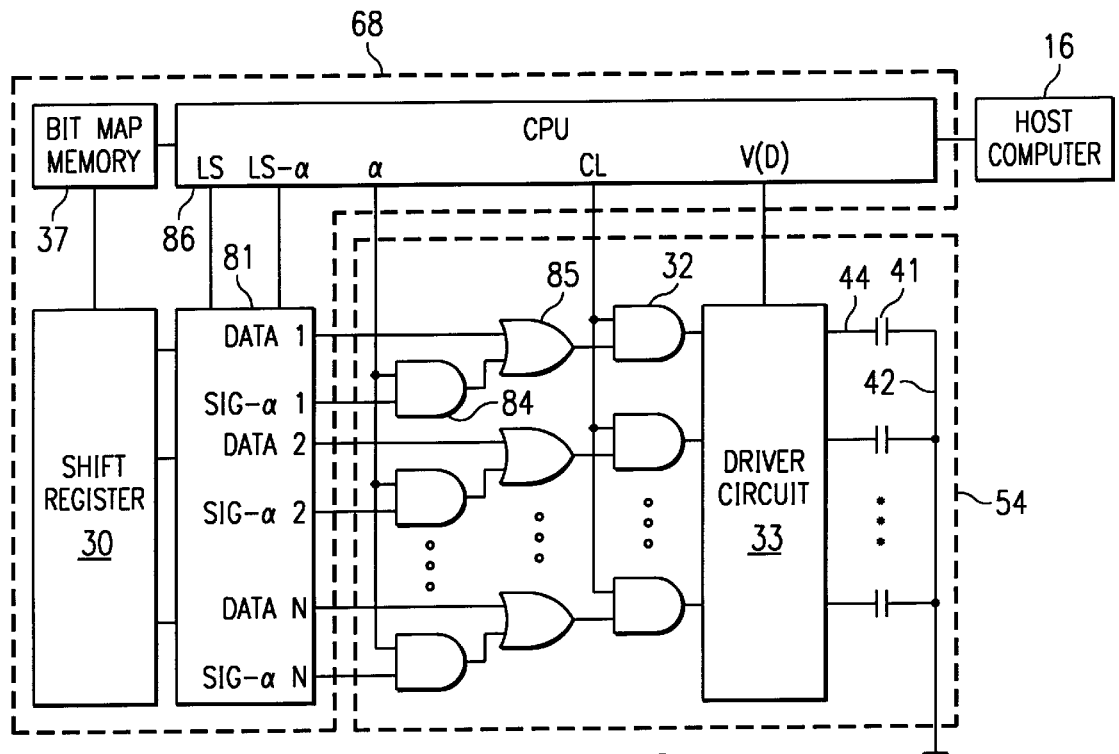

Optical Writing Device of a Second Embodiment
Structure and Operation of the Optical Writing Device FIG. 10 shows the structure of an optical writing device which is a second embodiment of the present invention. The optical writing device comprises a write head 54 and a modulation unit 68. Parts and members which are used for both the first and the second embodiments are referenced by the same numbers and marks. The write head 54 comprises light shutter elements 41 which are made of PLZT, a driver circuit 33, AND elements 32, 84 and OR elements .85. These elements 32, 33, 41, 84 and 85 are disposed on a glass board. One end of each light shutter element 41 is grounded via a common electrode 42, and the other end thereof is connected with the driver circuit 33 via an individual electrode 44. The driver circuit 33 drives the light shutter elements 41 individually.

The driver circuit 33 is impressed with a driving voltage V(D) by order of a CPU 86 of the modulation unit 68. The output terminal of each AND element 32 is connected with an input terminal of the driver circuit 33, and the driver circuit 33 receives image signals in accordance with image data from the AND elements 32. As described in connection with the first embodiment, each light shutter element 41 is turned on to transmit a light emitted from a light source when the image signal sent from the corresponding AND element 32 is at a level of "H", and it is turned off to shut out the light emitted from the light source when the image signal sent from the corresponding AND element is at a level of "L". Each AND element 32 has two input terminals. Each AND element 32 receives a control signal CL which determines the exposure time from the CPU 86 through one of the input terminals. The other input terminal of each AND element 32 is connected with the output terminal of the corresponding OR element 85. Each OR element 85 has two input terminals. Each OR element 85 receives image data from the latch circuit 81 through one of the input terminals. The other input terminal of each OR element 85 is connected with the output terminal of the corresponding AND element 84. Each AND element 84 has two input terminals. Each AND element 84 receives a supplement control signal $\alpha$ from the CPU 86 through one of the input terminals and receives supplementary data from the latch circuit 81 through the other input terminal.

The modulation unit 68 consists mainly of a shift register 30, the latch circuit 81, the CPU 86 and a bit map memory 37. The CPU 86 makes supplementary data from image data sent from a host computer 16, and the image data and the supplementary data are stored in the bit map memory 37. The bit map memory 37 first sends the supplementary data for one scanning line to the shift register 30 by order of the CPU 86. When the shift register 30 receives the supplementary data for one scanning line, the CPU 86 generates a latch pulse LS-$\alpha$ to the latch circuit 81, and the latch circuit 81 latches the supplementary data. The latch circuit 81 keeps on sending the supplementary data to the AND elements 84 as signals SIG-$\alpha$n during scanning of the line. Each AND element 84 also receives the supplement control signal $\alpha$ from the CPU 86, and only while the control signal $\alpha$ is at a level of "H", each AND element 84 transmits the supplement control data SIG-$\alpha$n to the corresponding OR element 85. The supplement control data SIG-$\alpha$n sent to the OR element 85 is added to image data, which are sent thereto from the latch circuit 81 through the other input terminal, and the image data and the data SIG-$\alpha$ are sent to the corresponding AND element 32.

The bit map memory 37 sends the image data for one scanning line to the shift register 30 subsequent to the sending of the supplementary data. When the shift register 30 receives the image data for one scanning line, the CPU 86 generates a latch pulse LS, and the latch circuit 81 latches the image data. Then, the image data are sent to the OR elements 85 and to the AND elements 32. When the control signal CL sent from the CPU 86 comes to the level of "H", the driving voltage V(D) is impressed on light shutter elements 41 which are selected in accordance with the image data. The light shutter elements 41 which are impressed with the driving voltage V(D) are turned on to transmit the light emitted from the light source and to expose the corresponding parts of the photosensitive drum 1. The exposure strength depends on the level of the driving voltage V(D). Light shutter elements 41 which are not impressed with the driving voltage V(D) are kept off to shut off the light emitted from the light source.

Application of the Optical Writing Device to Reversal (Negative-Positive) Development The following describes a case in which the optical writing device of the second embodiment is installed in an image forming apparatus which performs reversal (negative-positive) development. The relation among surface potential of the photosensitive drum 1, exposure value and tone under the reversal development was already described referring to FIG. 3.

Figure 11:
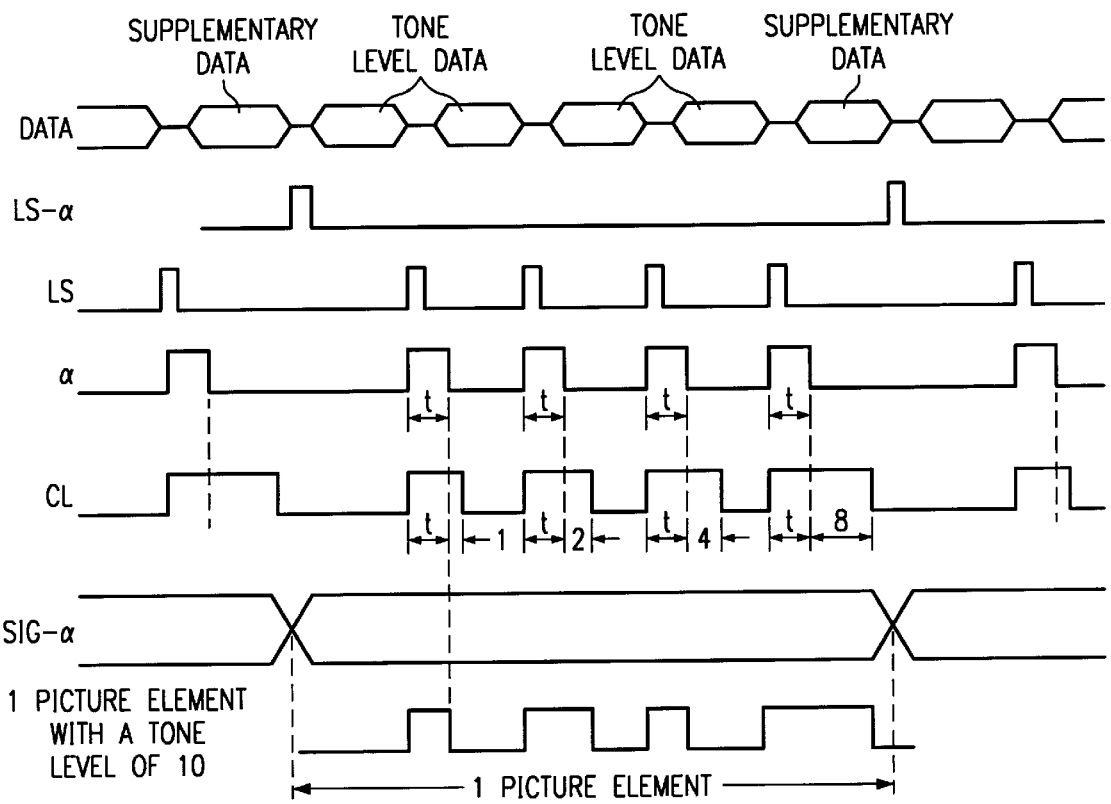

As shown in FIG. 11, a time required for scanning of one line is divided into four uniform periods, and control (selecting and driving) of the light shutter elements 41 is performed four times to scan one line. In other words, one picture element is formed by combining the total of four times of turning-on and turning-off of the corresponding light shutter element 41. The combination of turning-on and turning-off is made so that the accumulated exposure value of the corresponding picture element will lead to the desired tone level. A storage allocation of the bit map memory 37 for one scanning line is five times as large as that for one exposure of the line. A fixed voltage is impressed on the light shutter elements 41 in the four periods. As described above, in order to distinguish blank regions from imaged regions clearly, picture elements which will form the imaged regions require a supplementary exposure value. In this embodiment, the supplementary exposure value is allotted evenly among the four periods. Specifically, a driving time of each shutter element 41 to provide the supplementary exposure value is divided evenly into four periods, and the divided time is denoted by "t". Accordingly, the supplement control signal $\alpha$ is kept at the level of "H" for the time "t" in each period. The time "t" is determined depending on the conditions of the photosensitive drum 1 and the circumstances. The control signal CL is kept at the level of "H" for different times in the four periods. More specifically, the control signal CL is kept at the level of "H" for a time "1+t" in the first period, for a time "2+t" in the second period, for a time "4+t" in the third period and for a time "8+t" in the fourth period. Fifteen tone levels from 1 (the lightest) to 15 (the darkest) can be made by combining the turning-on of the light shutter elements 41 in the four periods. For example, if a picture element with a tone level of 10 is desired, the corresponding light shutter element 41 is driven as indicated in FIG. 11. In this way, all the picture elements which will form imaged regions are provided with the supplementary exposure value, and the surface potential thereof is sufficiently reduced. Thereby, toner deposition on blank regions will never occur. This control system makes good use of time, and therefore the optical writing device has a high duty factor. This control prevents a possible problem that the exposure section may not respond sufficiently to the signal CL because the signal CL is kept at the level of "H" only for extremely a short time. In order to solve the problem, conventionally, the time for which the signal CL is kept at the level of "H" is a little lengthened so that the exposure section can respond to the signal CL. In the second embodiment, the light shutter elements 41 corresponding to picture elements which will form imaged regions are driven for at least the time "t" in every period.

Figures 12, 13:
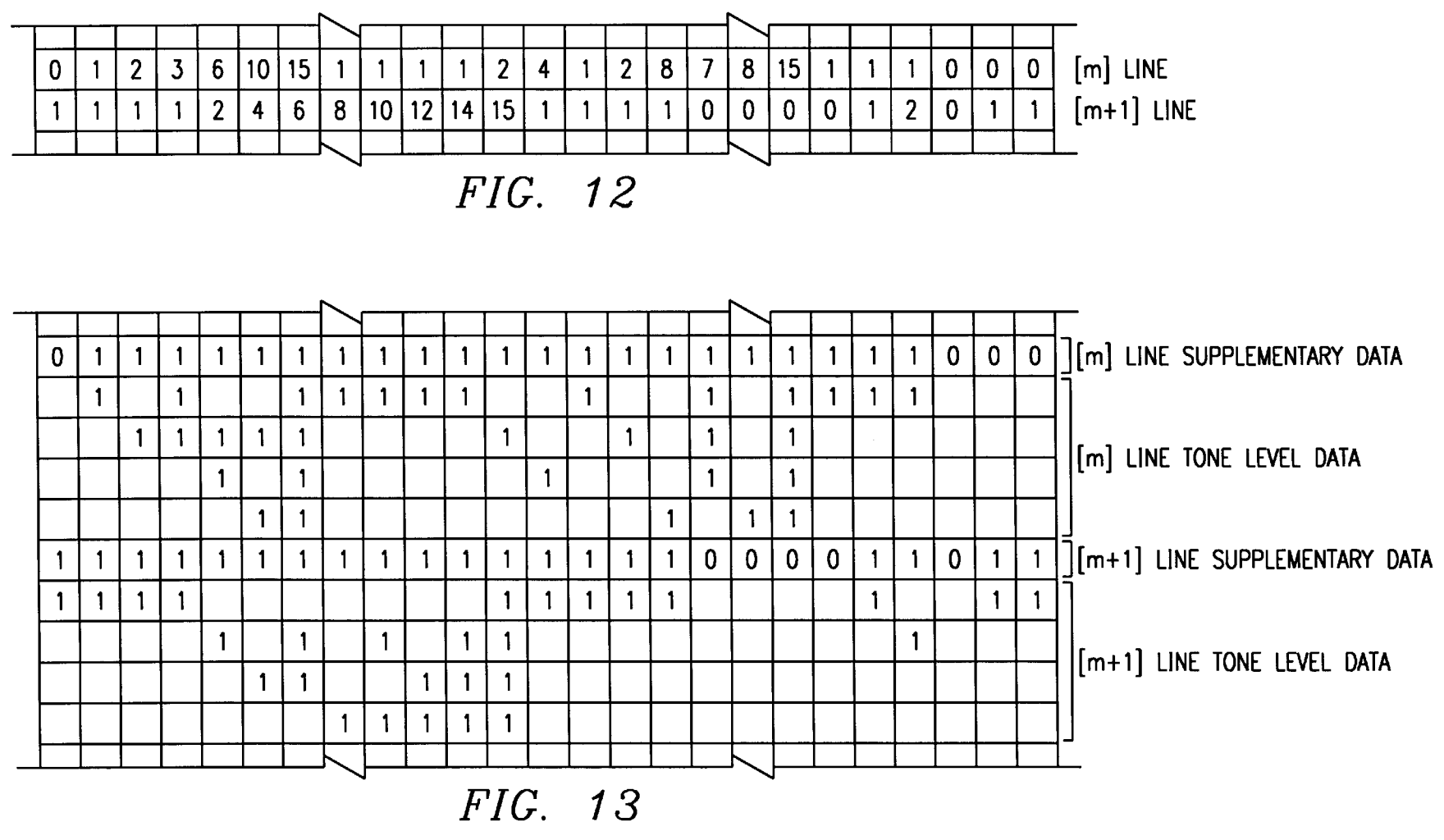

FIG. 12 shows desired tone levels of picture elements indicated by the numerals from 0 to 15. FIG. 13 shows data required for obtaining the tone shown in FIG. 5, and the data is stored in the bit map memory 37 so as to control each light shutter element 41 in cooperation with the control signal CL in the above-described manner. The supplementary data distinguish picture elements of blank regions and picture elements of imaged regions from each other. A state of "1" of the supplementary data commands that the corresponding signal SIG-α maintain the level of "H" during the four-period scanning of the picture element to drive the corresponding light shutter element 41 for the time "t" in every of the four periods. The image data determine the tone levels of the picture elements in the imaged regions. A state of "1" of the image data commands that the corresponding light shutter element 41 be driven for the time "1", "2", "4" or "8" in addition to the time "t" in the designated period.

Other Embodiments

Although the present invention has been described in connection with the preferred embodiments above, it is to be noted that various changes and modifications will be possible to those who are skilled in the art. Such changes and modifications are to be understood as being within the. scope of the present invention.

The light shutter elements may be liquid crystal or LEDs. If LEDs are used, exposure is performed by light emission of the LEDs. The exposure strength is controlled by varying the voltage impressed on the LEDs.

According to the first embodiment, one of the periods of scanning of one line is used to supplement the exposure value. However, it is possible to divide the time required for scanning of one line into more periods to use more than one of the periods to supplement the exposure value.

In the first embodiment, the tone levels from 1 to 15 are made by controlling the exposure strength or the exposure time based on a presumption that the surface potential of the photosensitive drum decreases in proportional to an increase in the exposure value. As described above, however, the decrease in the surface potential is not exactly proportional to the increase in the exposure value. The exposure strength and the exposure time may be controlled so that each picture element will obtain the exact surface potential which realizes the desired tone level.

Concerning the second embodiment, the supplementary exposure time does not have to be allotted to the four periods evenly. If there is a period where the control signal CL is at the level of "H" for extremely a short time, the drive of light shutter elements in the period will be ensured by allotting a larger share of the supplementary exposure time to the period.

In the second embodiment, the tone levels from 1 to 15 are made by controlling the exposure time based on a presumption that the surface potential of the photosensitive drum decreases in proportional to an increase in the exposure value. As described above, however, the decrease in the surface potential is not exactly proportional to the increase in the exposure value. The exposure time may be controlled so that each picture element will obtain the exact surface potential which realizes the desired tone level.

Although the above description of the second embodiment is only about a case wherein the optical writing device is used for reversal (negative-positive) development, the optical writing device can also be used for normal (positive—positive) development. In using the optical writing device for the normal development, picture elements which will form blank regions are provided with the supplementary exposure value. Thereby, toner deposition on the picture elements will never occur, and clear blank regions can be obtained.

In the above description, the optical writing devices of the first and the second embodiments are used to obtain an image with 16 tone levels, but they can be used to obtain an image with any number of tone levels.

What is claimed is:

1. An optical writing device which exposes a recording medium based on image data representative of an image to be reproduced, said image data including a plurality of bits to represent a tone level of a picture element, said optical writing device comprising:

an exposure element which exposes said recording medium;

a driver which drives said exposure element; and a controller which, using the image data, generates supplementary data which distinguishes all image regions from non-image regions of the image to be reproduced, outputs the image data and the supplementary data to the driver, and controls said driver to drive said exposure element a plurality of times for one picture element in accordance with said image data and said supplementary data, wherein each of said image data and said supplementary data corresponds to a number of driving operations for one picture element so that said exposure element is driven said plurality of times for one picture element based on both said image data and said supplementary data.

2. An optical writing device as claimed in claim 1, wherein said exposure element is driven for one picture element in accordance with said image data and said supplementary data in a predetermined order.

3. An optical writing device as claimed in claim 1, wherein said exposure element is driven so as to provide the recording medium with a specified exposure value in each of said driving operations for one picture element.

4. An optical writing device as claimed in claim 1, wherein said exposure element is driven so as to provide the recording medium with mutually different exposure values in respective driving operations for one picture element.

5. An optical writing device as claimed in claim 4, wherein said exposure element is impressed with mutually different voltages for a fixed term in the respective driving operations for one picture element.

6. An optical writing device as claimed in claim 4, wherein said exposure element is impressed with a fixed voltage for mutually different terms in the respective driving operations for one picture element.

7. An optical writing device as claimed in claim 4, wherein said exposure element is impressed with mutually different voltages for mutually different terms in the respective driving operations for one picture element.

8. An optical writing device as claimed in claim 1, wherein said exposure element is a PLZT light shutter element.

9. An optical writing device as claimed in claim 1, wherein said exposure element is a liquid crystal shutter element.

10. An optical writing device as claimed in claim 1, wherein said exposure element is an LED.

11. An optical writing device which exposes a recording medium based on image data representative of an image to be reproduced, said image data including a plurality of bits to represent a tone level of a picture element, said optical writing device comprising:

an exposure element which exposes said recording medium;

a driver which drives said exposure element; and a controller which generates supplementary data, distinguishing all image regions from blank regions of the image to be reproduced, from the image data, outputs the image data and the supplementary data to the driver, and controls said driver to drive said exposure element a plurality of times for one picture element in accordance with said image data and said supplementary data, wherein said exposure element is driven based on said supplementary data so as to expose said recording medium in case of said image data not representing a lowest tone level and wherein said exposure element is not driven based on said supplementary data in case of said image data representing the lowest tone level.

12. An optical writing device as claimed in claim 11, wherein said exposure element is driven so as to provide the recording medium with a specified exposure value in each drive for one picture element.

13. An optical writing device as claimed in claim 11, wherein said exposure element is driven so as to provide the recording medium with mutually different exposure values in respective drives for one picture element.

14. An optical writing device as claimed in claim 13, wherein said exposure element is impressed with mutually different voltages for a fixed term in respective drives for one picture element.

15. An optical writing device as claimed in claim 13, wherein said exposure element is impressed with a fixed voltage for mutually different terms in respective drives for one picture element.

16. An optical writing device as claimed in claim 13, wherein said exposure element is impressed with mutually different voltages for mutually different terms in respective drives for one picture element.

17. An optical writing device as claimed in claim 11, wherein said exposure element is a PLZT light shutter element.

18. An optical writing device as claimed in claim 11, wherein said exposure element is a liquid crystal shutter element.

19. An optical writing device as claimed in claim 11, wherein said exposure element is an LED.

20. An optical writing device which exposes a recording medium based on image data, said image data including a plurality of bits to represent a tone level of a picture element, said optical writing device comprising:

an exposure element which exposes said recording medium;

a driver which drives said exposure element; and a controller which generates supplementary data based on said image data and which outputs the image data and the supplementary data to the driver and controls said driver to drive said exposure element a plurality of times for one picture element in accordance with said image data and said supplementary data, wherein said exposure element is driven based on said supplementary data in case of the image data representing a lowest tone level, and wherein said exposure element is not driven based on said supplementary data in case of the image data not representing the lowest tone level.

21. An optical writing device as claimed in claim 20, wherein said exposure element is driven so as to provide the recording medium with a specified exposure value in each drive for one picture element.

22. An optical writing device as claimed in claim 20, wherein said exposure element is driven so as to provide the recording medium with mutually different exposure values in respective drives for one picture element.

23. An optical writing device as claimed in claim 22, wherein said exposure element is impressed with mutually different voltages for a fixed term in respective drives for one picture element.

24. An optical writing device as claimed in claim 22, wherein said exposure element is impressed with a fixed voltage for mutually different terms in respective drives for one picture element.

25. An optical writing device as claimed in claim 22, wherein said exposure element is impressed with mutually different voltages for mutually different terms in respective drives for one picture element.

26. An optical writing device as claimed in claim 20, wherein said exposure element is a PLZT light shutter element.

27. An optical writing device as claimed in claim 20, wherein said exposure element is a liquid crystal shutter element.

28. An optical writing device as claimed in claim 20, wherein said exposure element is an LED.

29. An optical writing device comprising:

an array of exposure elements for exposing a recording medium, each of the exposure elements being provided with image data representative of an image to be reproduced, said image data including a plurality of bits and representing a tone level of a picture element to be produced by an exposure element;

a driver which drives said exposure elements; and a controller which, using the image data, generates supplementary data which distinguishes all image regions from blank regions for each of the exposure elements for the image to be reproduced, outputs the image data and the supplementary data to the driver, and controls said driver to drive each of said exposure elements a plurality of times for one picture element in accordance with the image data and the supplementary data, said exposure elements being driven by said driver simultaneously, wherein each of said image data and said supplementary data corresponds to a number of driving operations for one picture element so that an exposure element is driven said plurality of times for one picture element based on both said image data and said supplementary data.

30. An optical writing device as claimed in claim 29, wherein each of said exposure elements is driven so as to provide the recording medium with a specified exposure value in each of the driving operations for one picture element.

31. An optical writing device as claimed in claim 29, wherein each of said exposure elements is driven so as to provide the recording medium with mutually different exposure values in respective driving operations for one picture element.

32. An optical writing device as claimed in claim 31, wherein each of said exposure elements is impressed with mutually different voltages for a fixed term in the respective driving operations for one picture element.

33. An optical writing device as claimed in claim 31, wherein each of said exposure elements is impressed with a fixed voltage for mutually different terms in the respective driving operations for one picture element.

34. An optical writing device as claimed in claim 31, wherein each of said exposure elements is impressed with mutually different voltages for mutually different terms in the respective driving operations for one picture element.

35. An optical writing device as claimed in claim 29, wherein said exposure elements are PLZT light shutter elements.

36. An optical writing device as claimed in claim 29, wherein said exposure elements are liquid crystal shutter elements.

37. An optical writing device as claimed in claim 29, wherein said exposure elements are LEDs.

38. An optical writing device comprising:
- an array of exposure elements for exposing a recording medium, each of the exposure elements being provided with image data representative of an image to be reproduced, said image data including a plurality of bits and representing a tone level of a picture element to be produced by an exposure element;
- a driver which drives said exposure elements simultaneously; and
- a controller which, using the image data, generates supplementary data which distinguishes all image regions from non-image regions for each of the exposure elements for the image to be reproduced, outputs the image data and the supplementary data to the driver, and controls said driver to drive each of said exposure elements a plurality of times for one picture element in accordance with the image data and the supplementary data,
- wherein each of said exposure elements is driven based on corresponding supplementary data in case of the corresponding image data not representing a lowest tone level, and wherein each of said exposure elements is not driven based on said corresponding supplementary data in case of the corresponding image data representing the lowest tone level.

39. An optical writing device as claimed in claim 38, wherein each of said exposure elements is driven so as to provide the recording medium with a specified exposure value in each drive for one picture element.

40. An optical writing device as claimed in claim 38, wherein each of said exposure elements is driven so as to provide the recording medium with mutually different exposure values in respective drives for one picture element.

41. An optical writing device as claimed in claim 40, wherein each of said exposure elements is impressed with mutually different voltages for a fixed term in respective drives for one picture element.

42. An optical writing device as claimed in claim 40, wherein each of said exposure elements is impressed with a fixed voltage for mutually different terms in respective drives for one picture element.

43. An optical writing device as claimed in claim 40, wherein each of said exposure elements is impressed with mutually different voltages for mutually different terms in respective drives for one picture element.

44. An optical writing device as claimed in claim 38, wherein said exposure elements are PLZT light shutter elements.

45. An optical writing device as claimed in claim 38, wherein said exposure elements are liquid crystal shutter elements.

46. An optical writing device as claimed in claim 38, wherein said exposure elements are LEDs.

47. An optical writing device comprising:
- an array of exposure elements for exposing a recording medium, each of the exposure elements being provided with image data, said image data including a plurality of bits, said image data representing a tone level of a picture element to be produced by an exposure element;
- a driver which drives said exposure elements simultaneously; and
- a controller which generates supplementary data based on said image data for each of the exposure elements and which outputs the image data and the supplementary data to the driver and controls said driver to drive each of said exposure elements a plurality of times for one picture element in accordance with the image data and the supplementary data,
- wherein said controller controls said driver to drive each of said exposure elements based on corresponding supplementary data in case of the corresponding image data representing a lowest tone level, and wherein each of said exposure elements is not driven based on said corresponding supplementary data in case of the corresponding image data not representing the lowest tone level.

48. An optical writing device as claimed in claim 47, wherein each of said exposure elements is driven so as to provide the recording medium with a specified exposure value in each drive for one picture element.

49. An optical writing device as claimed in claim 47, wherein each of said exposure elements is driven so as to provide the recording medium with mutually different exposure values in respective drives for one picture element.

50. An optical writing device as claimed in claim 49, wherein each of said exposure elements is impressed with mutually different voltages for a fixed term in respective drives for one picture element.

51. An optical writing device as claimed in claim 49, wherein each of said exposure elements is impressed with a fixed voltage for mutually different terms in respective drives for one picture element.

52. An optical writing device as claimed in claim 49, wherein each of said exposure elements is impressed with mutually different voltages for mutually different terms in respective drives for one picture element.

53. An optical writing device as claimed in claim 47, wherein said exposure elements are PLZT light shutter elements.

54. An optical writing device as claimed in claim 47, wherein said exposure elements are liquid crystal shutter elements.

55. An optical writing device as claimed in claim 47, wherein said exposure elements are LEDs.

56. An optical writing device which exposes a recording medium based on image data representative of an image to be reproduced, said image data including a plurality of bits to represent a tone level of a picture element, said optical writing device comprising:
- an exposure element which exposes said recording medium;
- a driver which drives said exposure element; and a controller which, using the image data, generates supplementary data which distinguishes all image regions from blank regions of the image to be reproduced, outputs the image data and the supplementary data to the driver, and controls said driver to drive said exposure element a plurality of times for one picture element in accordance with said image data and said supplementary data, wherein said image data and said supplementary data for one picture element have a total number of bits equal to a number of driving operations for one picture element so that said exposure element is driven said plurality of times for one picture element based on both said image data and said supplementary data.

\* \* \* \* \*